United States Patent
Glover

(10) Patent No.: US 8,485,369 B2
(45) Date of Patent: Jul. 16, 2013

(54) MOTORCYCLE STAND

(76) Inventor: Woodrow Loyd Glover, Fort Lupton, CO (US)

(*) Notice: Subject to any disclaimer, the term of this patent is extended or adjusted under 35 U.S.C. 154(b) by 909 days.

(21) Appl. No.: 12/338,889

(22) Filed: Dec. 18, 2008

(65) Prior Publication Data

US 2009/0250564 A1    Oct. 8, 2009

Related U.S. Application Data

(60) Provisional application No. 61/008,087, filed on Dec. 18, 2007.

(51) Int. Cl.
*A47F 7/04*    (2006.01)

(52) U.S. Cl.
USPC .............................................. 211/24; 211/22

(58) Field of Classification Search
USPC .. 248/346.01, 346.03, 346.06, 176.1; 211/19, 211/20, 21, 22, 23, 24; 280/79.4; 482/148
See application file for complete search history.

(56) References Cited

U.S. PATENT DOCUMENTS

| | | | | |
|---|---|---|---|---|
| 4,126,228 | A * | 11/1978 | Bala et al. | 211/5 |
| 5,301,817 | A * | 4/1994 | Merritt | 211/5 |
| 6,488,157 | B2 * | 12/2002 | Chen | 211/20 |
| 2006/0104738 | A1 * | 5/2006 | Nolasco et al. | 410/2 |
| 2006/0144804 | A1 * | 7/2006 | Chiu | 211/20 |
| 2006/0237376 | A1 * | 10/2006 | Eakin | 211/20 |
| 2007/0017882 | A1 * | 1/2007 | Lewis | 211/20 |
| 2009/0071915 | A1 * | 3/2009 | Kay et al. | 211/24 |
| 2010/0122958 | A1 * | 5/2010 | Tsai | 211/22 |

OTHER PUBLICATIONS

Motorcyclecarrier.Net, "Motorcycle Chocks," imaged Nov. 8, 2007, 3 pages, online at: http://www.motorcyclecarrier.net/motorcycle_chocks.html, USA.
Strapless Transport Systems, "Home," imaged Nov. 8, 2007, 1 page, online at: http://www.ststands.com/main.cfm, USA.
Strapless Transport Systems, "Stands in Use," imaged Nov. 8, 2007, 1 page, online at: http://www.ststands.com/standsinuse.cfm, USA.

* cited by examiner

*Primary Examiner* — Alfred J Wujciak
(74) *Attorney, Agent, or Firm* — Kevin M. Curran; Curran Patent Law

(57) ABSTRACT

Apparatus, systems, and methods involve a motorcycle stand for adjustably securing a motorcycle, such as for storing or transporting a motorcycle in an immobilized, upright position. A motorcycle stand in accordance with one or more embodiments of the present invention may include a stand base connected to an axle support post. At a top end of the axle support post, the axle support post includes an axle bar slot having a self-engaging latch. An axle bar may be inserted into the axle bar slot and engage the self-engaging latch. The self-engaging latch may include a release mechanism to disengage the latch, to release the axle bar from the axle bar slot, and to reset the self-engaging latch. A stand may include two axle support posts for engagement on either side of a wheel axle. A motorcycle stand system may include one or more stands and an axle bar.

8 Claims, 8 Drawing Sheets

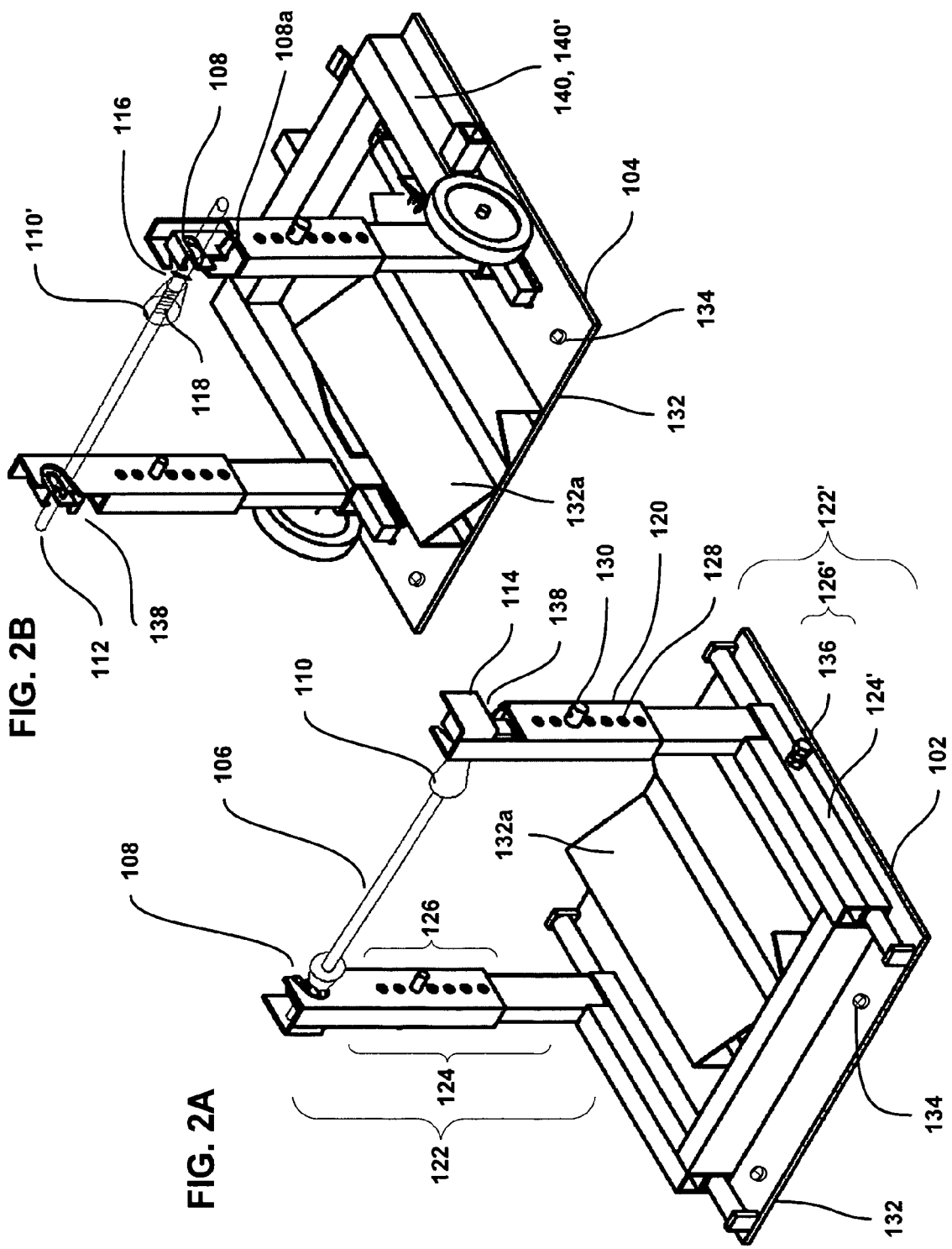

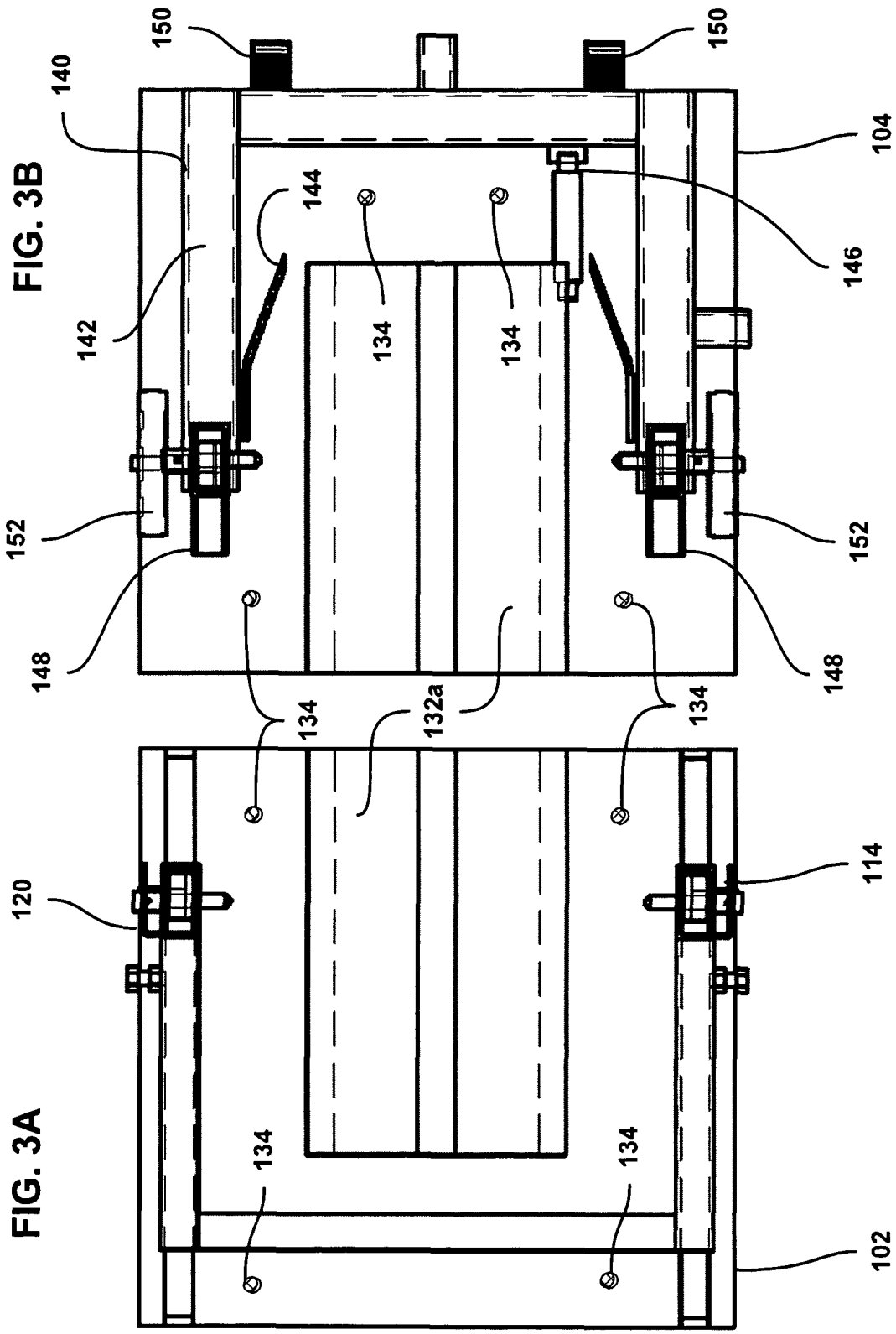

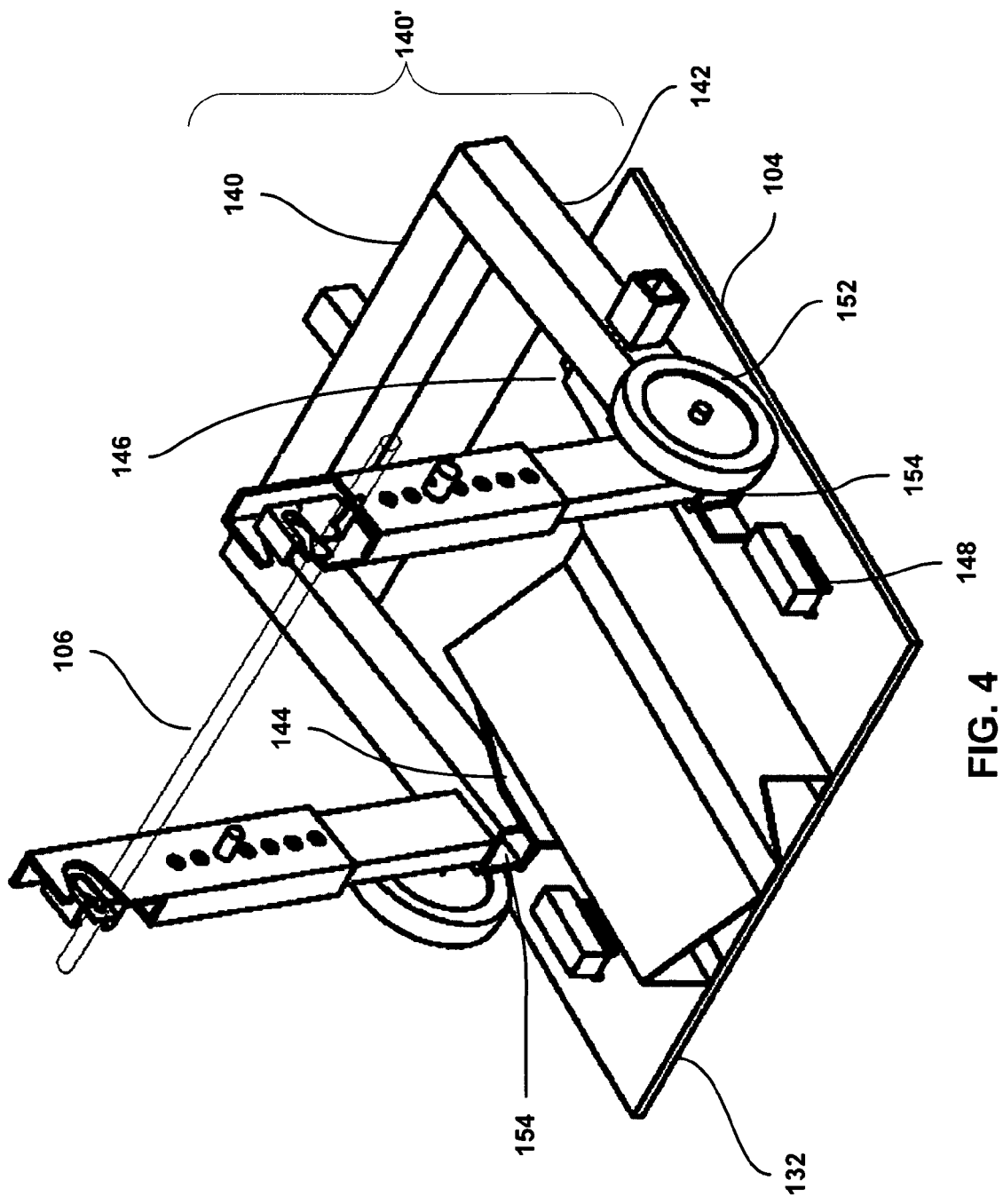

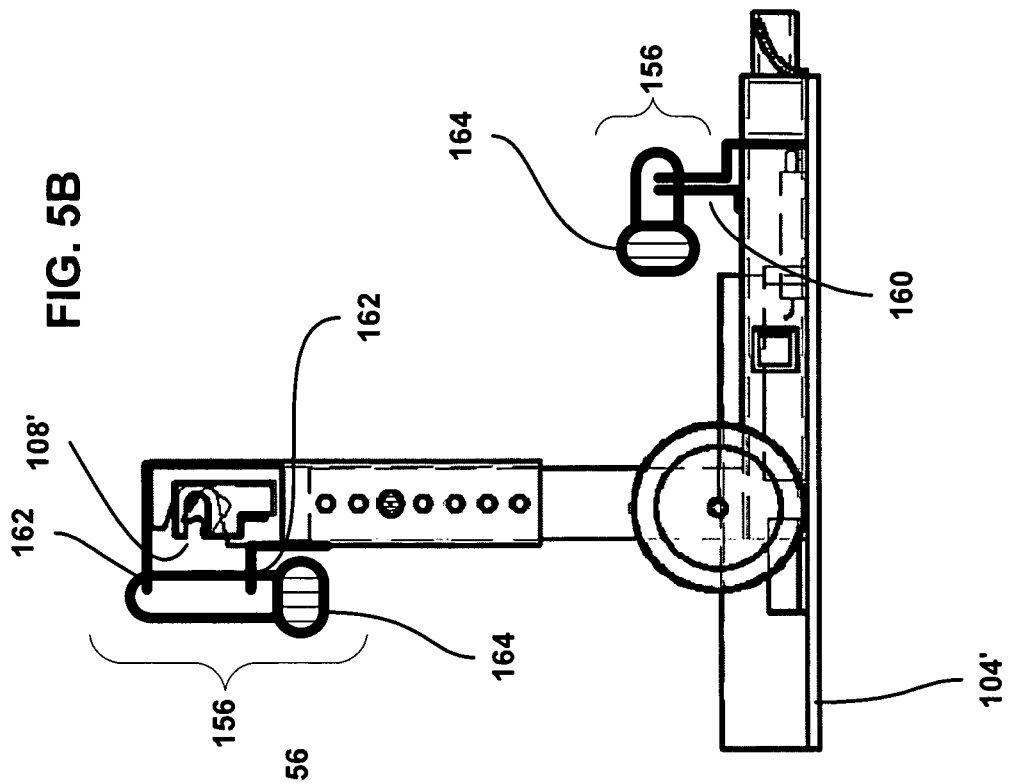
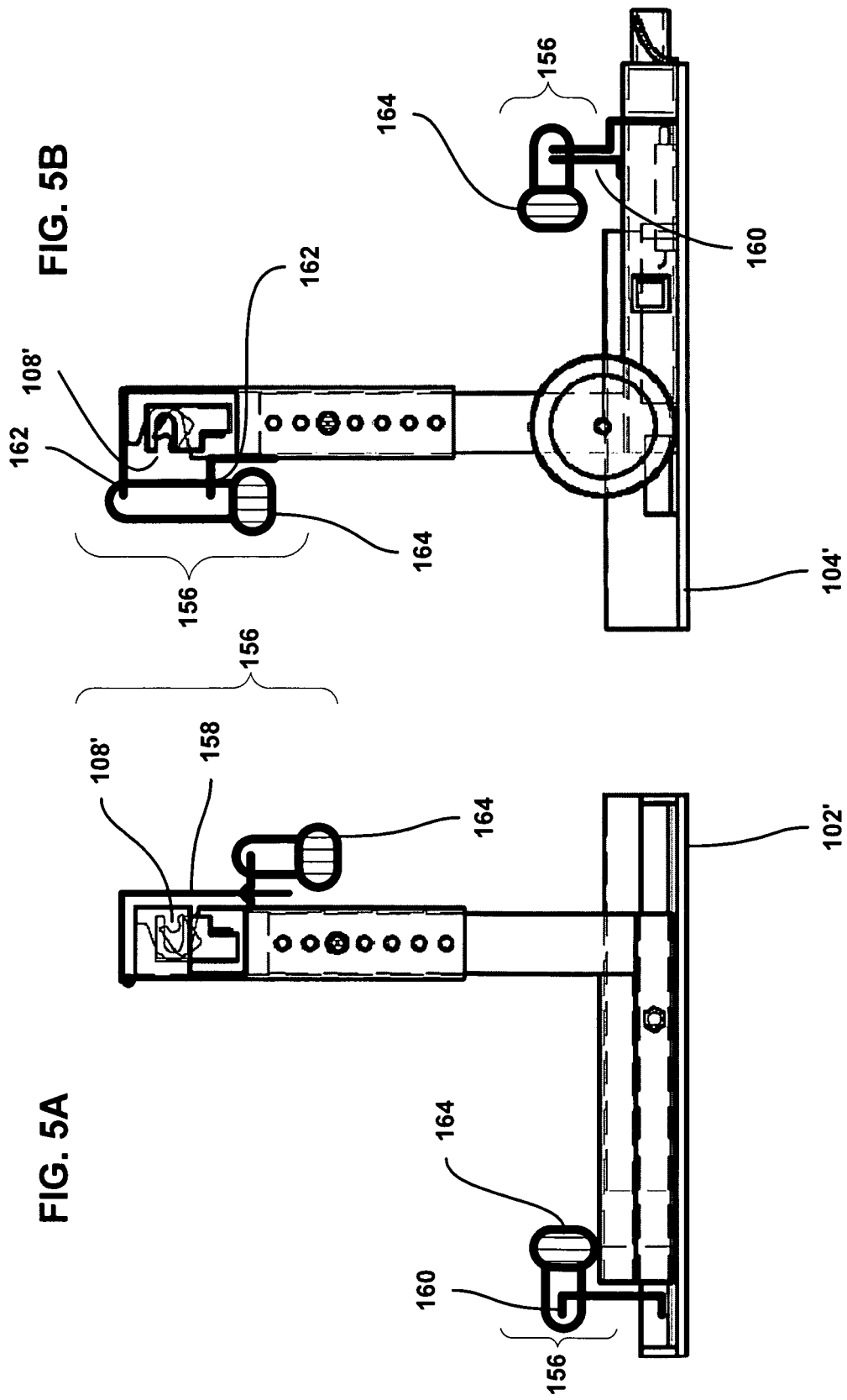

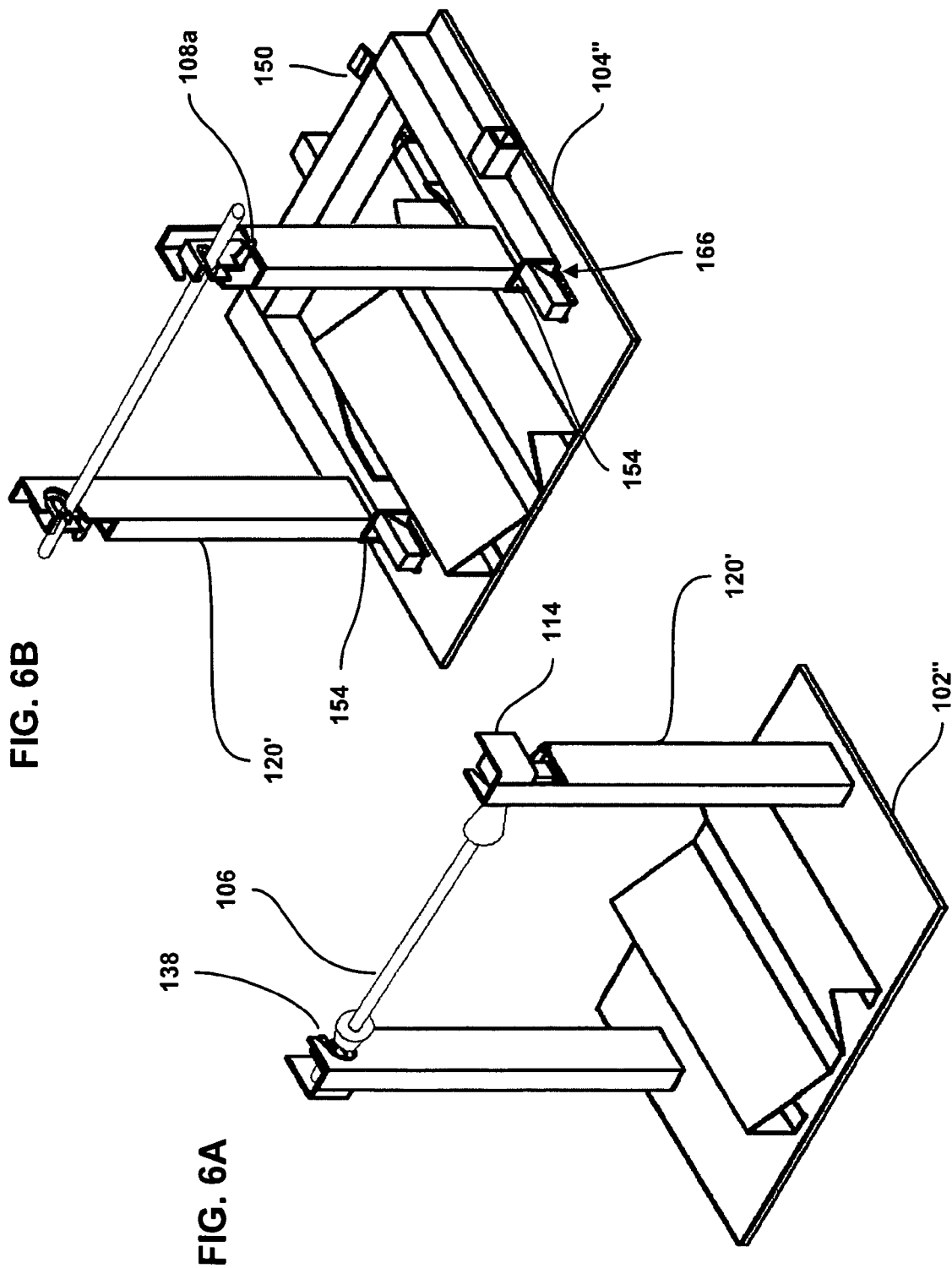

MOTORCYCLE STAND

CROSS-REFERENCE TO RELATED APPLICATIONS

The present application claims priority to the U.S. Provisional Patent Application 61/008,087, titled "MOTORCYCLE STAND," to Glover, filed on Dec. 18, 2007, and incorporated herein by reference in its entirety for all purposes.

BACKGROUND OF THE INVENTION

1. Field of the Invention

Embodiments of the invention described herein pertain to the field of securing a motorcycle for transportation or storage. More particularly, but not by way of limitation, the invention pertains to motorcycle stands, motorcycle chocks and motorcycle transportation devices. Embodiments of the invention are directed to apparatus and methods for adjustably securing a motorcycle via at least one wheel axle.

2. Description of the Related Art

In certain circumstances it is desirable to secure a motorcycle, such as for transportation or storage. The motorcycle may be secured, for instance, in an upright position, such that the motorcycle may be rolled on its wheels into and out of the securing device or mechanism.

Conventional systems for securing a motorcycle in an upright position often involve the use of straps that attach to the wheels or the frame of the motorcycle. Adjustment of the straps creates tension in the straps that holds the motorcycle in place. However, the tension may put extra pressure on the shocks of the motorcycle, possibly altering the normal ride calibration of the shocks in an unwanted manner. Also, the motorcycle is only secure when the straps are tense and properly placed. Misplacement of the straps or inadequate tension in the straps may cause the motorcycle to lean or wobble during transportation.

Other conventional systems for securing a motorcycle in an upright position may involve the use of a chock to stabilize the wheel of the motorcycle. In addition to the chock, another mechanism may hold the motorcycle in place. For instance, straps may be used, or a brace may be attached to the frame or wheel of the motorcycle. Either a wheel brace or a frame brace likely is specific to the type and size of motorcycle, thereby limiting its versatility, as it may be of fixed dimensions for more stability and strength in supporting the motorcycle.

In a product from Strapless Transport Stands, a motorcycle stand is provided that consists of a fixed construction, having fixed-height axle support posts and base and using manually-operated sliding barriers that are manually raised to insert an axle bar and then manually dropped in front of the axle bar when the axle bar is positioned into an axle bar slot on each axle support. This motorcycle stand from Strapless Transport Stands is an improvement over earlier stands employing straps, but it still has drawbacks. For instance, to get the axle bar in position within the axle bar slot, the motorcycle needs to be raised off the ground as the axle bar follows an axle bar guide ramp into axle bar slot. Securing the motorcycle with its wheel raised off the ground may avoid putting pressure on the shocks, but it requires the user to do heavy lifting, which may be even more detrimental, both to the user and the bike.

Furthermore, the sliding barrier also needs to be manually raised to provide access to the axle bar slot as the axle bar is guided up the ramp into the axle bar slot. This operation may require two or more people, as one person may be needed to guide and roll the vehicle, another may be needed to lift and position the wheel, and a third may be needed to raise and lower the sliding barrier. Once the axle bar is positioned in the slot, the sliding barrier is dropped in place, impeding the axle bar from moving out of the axle bar slot. Similarly, more than one person may be needed to disengage the sliding barrier, lift the wheel, and remove the cycle, all without the cycle tipping over.

For at least the limitations described above, there is a need for an apparatus, a method, and a system that secure a motorcycle in a way that makes the motorcycle easy to secure, avoids putting extra pressure on the shocks of the motorcycle, avoids the potential slack and wobble associated with using straps, and is adjustable to varying dimensions of different motorcycles.

SUMMARY OF THE INVENTION

One or more embodiments of the invention enable a user to secure a motorcycle in an upright position using an axle bar engaged in at least one axle bar self-engaging latch in an axle bar slot located at a top of an axle support post connected to a stand base. The self-engaging latch preferably engages the axle bar at a height of an axle of a wheel of a rider-less motorcycle when the wheel is positioned on the stand base.

A first exemplary embodiment of the present invention may include a stand base connected to two axle support posts at proximate ends of the axle support posts. At a distal end of each axle support, each axle support may include an axle bar slot having a self-engaging latch. An axle bar may be inserted into the axle bar slots and thereby engage the self-engaging latches. Each self-engaging latch may include a release mechanism to disengage the axle bar, to release the axle bar from the axle bar slot, and to reset the self-engaging latch.

In addition to the elements of the first exemplary embodiment, a second exemplary embodiment of the present invention also may include a height adjustment mechanism on each axle support, so that the axle support may be lengthened or shortened. Adjusting the height may help, for example, to accommodate motorcycles of different wheel radii.

In addition to the elements of the first exemplary embodiment, a third exemplary embodiment of the present invention also may include a horizontal position adjustment mechanism connected to each axle support, so that a horizontal position of the axle support posts may be adjusted. Adjusting the horizontal position may help, for instance, to accommodate motorcycles of different lengths between axles, or tightening of the motorcycle chain.

In addition to the elements of the first exemplary embodiment, a fourth exemplary embodiment of the present invention also may include a wheel chock positioned on top of the stand base and between the axle support posts. The wheel chock may assist the user in centering the motorcycle when the user guides the wheel into place. The wheel chock also may help stabilize the wheel by contacting a tire on the wheel.

In addition to the elements of the first exemplary embodiment, a fifth exemplary embodiment of the present invention also may include an horizontal engagement mechanism connected to each axle support post, so that a horizontal position of the axle support posts may be releasably engaged as well as adjusted. Horizontal engagement of axle support posts with the stand base may facilitate quick and easy attachment of the axle bar to the axle support posts and horizontal positioning of the axle support posts.

The details of one or more embodiments of the invention are set forth in the accompanying drawings and the description below. Other features, improvements, and advantages of aspects of the invention will be apparent from the description and drawings, and from the claims. The drawings are not intended to depict every detail of embodiments according to the present invention, nor are the drawings necessarily to scale. The drawings are merely exemplary of possible aspects of the present invention that may be combined or used individually and nevertheless remain within the scope of the invention.

BRIEF DESCRIPTION OF THE DRAWINGS

By reference to the appended drawings, which illustrate exemplary embodiments of the invention, the detailed description provided below explains in detail various features, advantages and improvements of the present invention.

It is to be noted, however, that the appended drawings are not intended to necessarily be to scale or mechanically complete. They illustrate only isolated embodiments of this invention; they therefore are not to be considered as limiting of its scope, for the invention may admit to other equally effective embodiments.

FIGS. 2A and 2B illustrate perspective views of the exemplary adjustable motorcycle stands of FIG. 1.

FIGS. 3A and 3B depict top plan views of the exemplary adjustable motorcycle stands of FIGS. 2A and 2B.

FIG. 4 illustrates a perspective view of the exemplary pivotable, adjustable motorcycle stand of FIG. 1, in a disengaged state.

FIGS. 5A and 5B depict side elevation views of additional exemplary adjustable motorcycle stands according to additional embodiments of the present invention.

FIGS. 6A and 6B illustrate perspective views of further exemplary adjustable motorcycle stands according to further embodiments of the present invention.

DETAILED DESCRIPTION OF THE INVENTION

One or more embodiments of invention directed to a motorcycle stand will now be described. With reference to the drawings, FIGS. 1 to 8 depict exemplary embodiments of a motorcycle stand in accordance with aspects of the present invention and in various positions and stages of engagement. Embodiments of the invention may be used in the context of storing or transporting a motorcycle, such as in an upright position. Aspects of the invention allow users to rapidly adjust and secure a motorcycle via attachment of the motorcycle stand to an axle bar placed within an axle of a wheel of the motorcycle.

Figure 1:
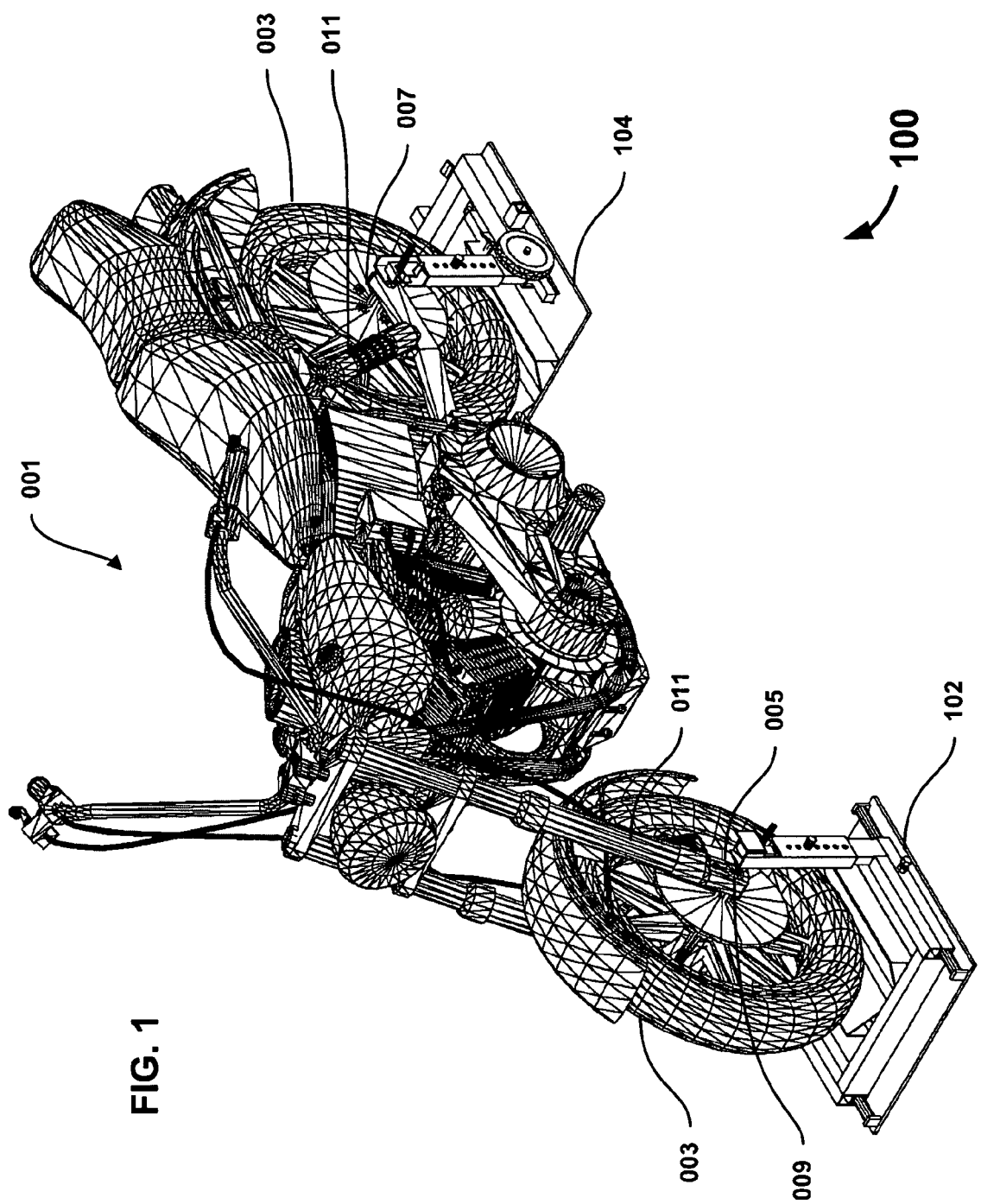
FIG. 1 depicts a perspective view of a motorcycle held in an upright position by a motorcycle stand system according to an exemplary embodiment of the present invention, secured at a front axle by an exemplary slideable, adjustable motorcycle stand according to another embodiment of the present invention, and secured at a rear axle by an exemplary pivotable, adjustable motorcycle stand according to a further embodiment of the present invention.

FIG. 1 depicts a perspective view of a motorcycle 001 held in an upright position by a motorcycle stand system 100 according to an exemplary embodiment of the present invention. The motorcycle stand system 100 may include one or more stands 102, 104, such as one stand per wheel 003. A standard two-wheel motorcycle may use one or two stands 102, 104, whereas a three-wheel motorcycle may one to three stands, and a four-wheel vehicle may use one to four stands. A three-wheel or four-wheel vehicle may use the stands 102, 104 primarily for immobilization and theft-deterrence, whereas a two-wheel motorcycle also benefits from the upright stability provided by the stands 102, 104. However, use of two stands may suffice for transportation of a two-wheel, three-wheel or four-wheel vehicle insofar as two stands may inhibit movement front to back, side to side, as well as up and down.

The motorcycle 001 may be secured at a front axle 005 by an exemplary slideable, adjustable motorcycle stand 102 in accordance with an embodiment of the present invention, and secured at a rear axle 007 by an exemplary pivotable, adjustable motorcycle stand 104 in accordance with another embodiment of the present invention. Some embodiments of the present invention build upon the fact that a conventional axle 005, 007, resembles a cylindrical pipe having a straight bore 009 from side to side. For instance, in FIG. 1, axle bars 106 may be placed within the bores 009 of the axles 005, 007 of the front and rear wheels 003 to be secured by engagement with self-engaging latches 108 of the two motorcycle stands 102, 104. In the event an axle 005, 007 does not have a bore 009, an adapter (not shown) may be secured to the axle 005, 007, such as underneath an axle nut (not shown), that may hold or replace the axle bar 106. The self-engaging nature of the self-engaging latches 108 may greatly facilitate securing a wheel 003 inasmuch as a wheel 003 having an axle bar 106 ready within its axle 005, 007 may need only to be rolled into place for engagement with the self-engaging latches 108 to occur.

FIGS. 2A and 2B illustrate, respectively, perspective views of exemplary adjustable motorcycle stands 102 and 104. By comparison, FIGS. 3A and 3B depict top plan views of the exemplary adjustable motorcycle stands 102, 104 of FIGS. 2A and 2B. Similarly, FIG. 4 illustrates a perspective view of the exemplary pivotable, adjustable motorcycle stand 104 of FIG. 2B, in a disengaged state. In contrast, FIGS. 5A to 8 illustrate stands modified in accordance with aspects of the present invention. Excepted as noted below, illustrations of components sharing reference numerals between FIGS. 1 to 8 generally refer to the same or similar components.

Stands 102 and 104 may include self-engaging latches 108 that engage and secure axle bars 106. Self-engaging latches 108 are illustrated in more detail in FIGS. 5A and 5B. Axle bars 106 may include bushings 110 as a buffer and/or immobilization device for the axle bars 106. A bushing 110 may be removable from and/or fixedly attached to the axle bar 106.

Figure 7:
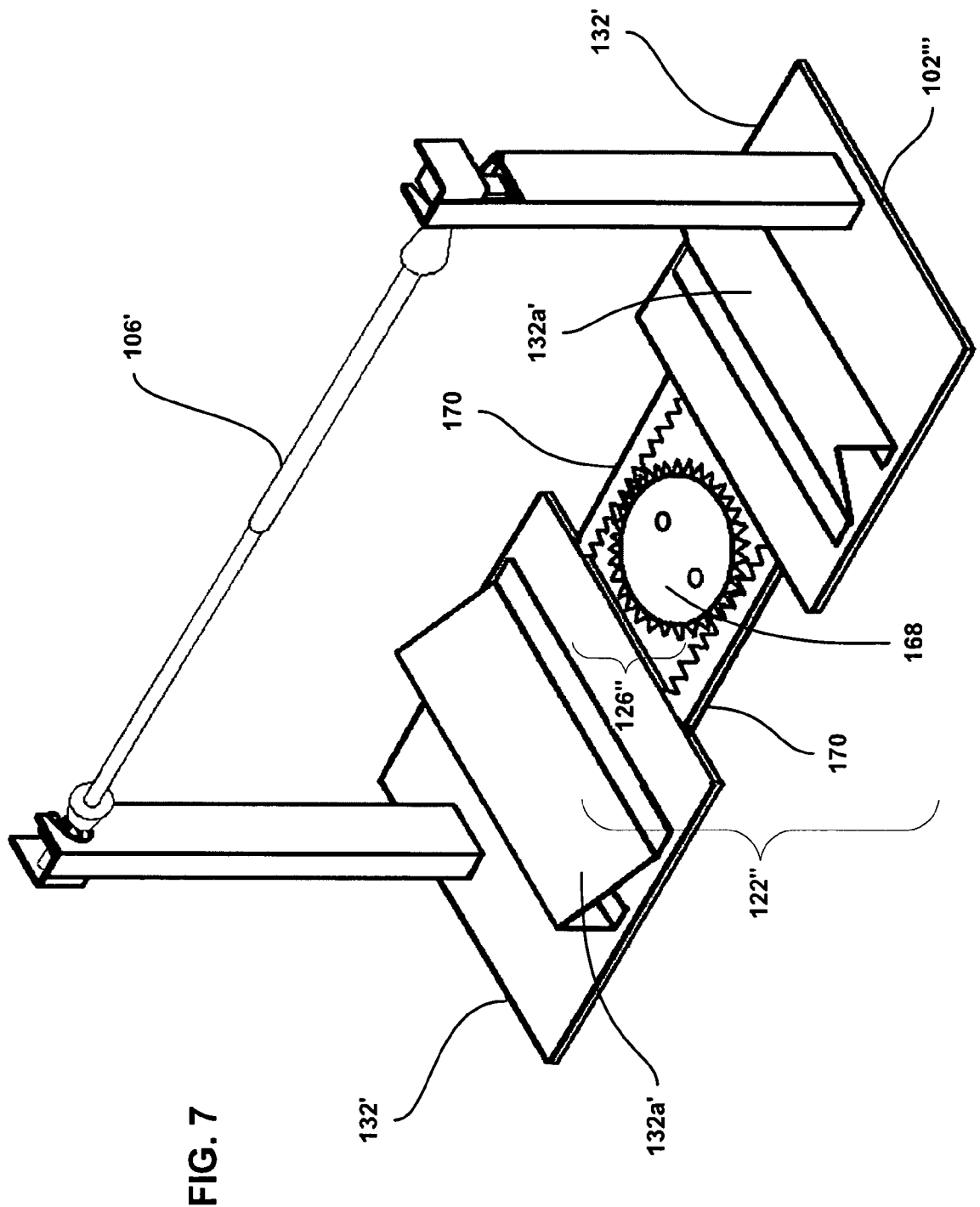
FIG. 7 depicts a perspective view of another exemplary adjustable motorcycle stand according to another embodiment of the present invention.

As shown in FIGS. 2A, 6A, and 7, in some embodiments, two removable bushings 110 may be used recessed from distal ends 112 of the axle bar 106, where a stand 102 includes flanges 114 that inhibit the lateral movement of the axle bar 106 after engagement with the stand 102. Flanges 114 may improve immobilization of the axle bar 106 and reduce the ease with which the motorcycle 001 may be stolen through forced removal from the stand 102. Flanges 114 also are depicted in FIGS. 1, 3A and 5A, although FIGS. 3A and 5A do not depict the axle bars 106. Although flanges 114 may be used to prevent the axle bar 106 from extending laterally beyond the flange 114, the flanges 114 may be designed to permit the axle bar 106 from extending laterally beyond flange 114, as shown in FIG. 1.

In other embodiments, a bushing 110 may be both removable and inhibit theft where the axle bar 106 is shaped so as the limit the movement of the bushing 110 once the axle bar 106 is insert into the bushing 110. For instance, as shown in FIG.

2B, the axle bar 106 may be flared or notched 116 near the desired position of the bushing 110 and opposite a distal end 112 of the bar 106.

As shown in FIG. 2B, in other embodiments, a fixed bushing 110' may be fixedly attached to the axle bar 106 to keep the axle bar 106 from being removed laterally from the axle bore 009 after engagement with a stand 104, such as to inhibit theft if flanges 114 are not present. The bar 106 and bushing 110' in FIG. 2B, and bar 106 in FIG. 4, are depicted as transparent to make the parts within and behind them visible. For instance, fixed bushing 110' may be welded or glued to axle bar 106. The fixed bushing 110' also may be fixedly attached by being screwed into place around threads 118 like a nut in around a bolt. In such an arrangement, a distal end 112 of the axle bar 106 away from the fixed bushing 110' may be inserted into an axle bore 009 prior to engagement with the stand 104. In some embodiments, the axle bar 106 then may be inserted into a removable second bushing 110 placed on the opposite side of the axle bore 009 to buffer the axle 007 from the stand 104.

A stand 102, 104 also may include vertical axle support posts 120 that support and house the self-engaging latches 108. A vertical axle post 120 may be attached to the stand 102, 104 at a bottom end of the post 120. Axle support posts 120 support and stabilize the axles 005, 007 to inhibit side to side movement, e.g., leaning, of the motorcycle 001. Posts 120 also may support some of the vertical weight of the motorcycle 001, but generally posts 120 preferably are positioned to be at the same height of the axles 005, 007 when a rider-less motorcycle 001 is fully supported by its shocks 011. As such, posts 120 may be adjustable in height (shown, e.g., in FIGS. 2A and 2B) to accommodate wheels of varying radii, or posts 120' may be a fixed height (shown in FIGS. 6A, 6B, and 7). Adjustable posts 120 may include an adjustment mechanism 122 to accomplish this vertical adjustment. Adjustment mechanism 122 may include, for instance, a telescoping housing 124 and a position fixing mechanism 126, such as holes 128 and pin 130.

The bottom end of a post 120 may be attached to a stand base 132, which optionally may include a chock 132a. The optional chock 132a may be integral to or removably attached to the stand base 132. The stand base 132 may be attached and secured, for instance, to a motorcycle transport trailer (not shown), using attachment means or attachment devices 134, such as welding, screws, rivets, bolts, etc. The post 120 may attached to the stand base 132 in an adjustable manner (shown, e.g., in FIGS. 2A, 3A and 5A), or at a fixed position (shown in FIGS. 6A and 7). Moreover, the post 120 may be removeably attached to the stand base 132, as in stand 104 (shown, e.g., in FIGS. 1, 2B, 3B, and 4). Attachment of the post 120 in an adjustable manner may include a further adjustment mechanism 122' positioned to adjust the post 120 back and forth (e.g., front to back). Adjustment mechanism 122' may include a telescoping and/or slideable housing 124' and a position fixing mechanism 126', such as screw 136.

Each self-engaging latch 108 may be located in an axle bar slot 138 near a top end of the post 120. Axle bars 106 are depicted in FIGS. 1, 2A, 2B, 6A, 6B, 7, and 8 as positioned in slots 138 and engaged with closed self-engaging latches 108 of each depicted stand. In contrast, the axle bar 106 depicted in FIG. 4 has not yet engaged an open self-engaging latch 108'. FIGS. 3A, 3B, 5A, and 5B do not depict axle bars 106. Likewise, portions of open self-engaging latches 108' depicted in FIGS. 5A and 5B are cocked at an angle, ready to receive an axle bar 106.

Upon arrival at an open latch 108', the axle bar 106 may move and rotate portions of the open latch 108' so as to close the latch 108 and engage the bar 106. The movable portions of a self-engaging latch 108 may be spring-loaded, for instance. Disengagement of the closed latch 108 may be accomplished by movement of a release mechanism, e.g., latch lever 108a, such as to reset and/or re-load a latch spring and rotate the movable portions of the latch 108 back to an open, ready position. The depicted and described self-engaging latches and latch mechanisms are exemplary, however, and any suitable self-engaging latch and latch mechanism may be used.

Note that outer flanges 114, depicted, e.g., in FIGS. 2A and 3A, adjacent the axle bar slots 138 may be used to guide the axle bars 106 into place within the slots 138. The outer flanges 114 also may reduce a risk of an axle bar 106 poking an object that may come into contact with the stand 102 near the slots 138. Similarly, the axle bar 106 preferably includes the spacer bushings 110, such as made of plastic (e.g., nylon), that help position the axle bar 106 relative to the axle slots 138. As discussed above, the axle bar 106 may be installed in the axle bore 009 of a wheel axle 005, 007 where the wheel axle forms a narrow cylinder into which the axle bar 106 may be inserted. A cotter pin (not shown) may need to be removed from the wheel axle 005, 007 to do so.

As depicted in FIG. 1, stand 102 may be used to secure a front axle 005, and stand 104 may be used to secure a rear axle 007. However, this arrangement may be reversed, or mixed, in other embodiments of the invention. A rationale for having separate stand configurations for the front and rear axles 005, 007, is that securing the axles may follow a two-stage method. In a two-stage method, first a wheel 003 may be rolled into place to engage a stationary stand 102, fixing the position of the motorcycle 001, which is rolled on top a second stand base 132 of a second stand 104. With the motorcycle 001 position fixed, a detachable assembly 140 of a second stand 104 may be attached to and engage another wheel 003 and then pivoted downward to attach to and engage the second stand base 132 positioned below the other wheel 003. To simplify this two-stage method, the bike moves to and engages the first stand, after which the second stand is moved to and engages the bike and then the base. Such a two-stage method may incorporate the fact that the bases 132 may be fixedly attached by means 134, such as bolts, screws, rivets, etc., to a motorcycle trailer platform (not shown).

FIG. 4 illustrates a perspective view of the exemplary pivotable, adjustable motorcycle stand 104 of FIGS. 1, 2B, and 3B, in a disengaged state. Stand 104 is pivotable in the sense that, once post 120 engages an axle bar 106, a detachable assembly 140 may pivot or rotate around the axle bar 106, and possibly around a wheel 003. Stand 104 may be used in a two-stage engagement method described above. In this disengaged state, the post 120 and self-engaging latches 108 are being brought into engagement with the axle bar 106. After engagement with the axle bar 106, the post 120 may be removably attached to the stand base 132 via a post-base interface comprising a pivotable engagement mechanism comprising the detachable assembly 140. As shown, e.g., in FIGS. 2B, 3B, and 4, the pivotable engagement mechanism 140' may include, for instance, a U-frame 142, a horizontal engagement guide 144, a horizontal engagement latch 146, a horizontal engagement stop 148, a horizontal engagement tab 150, and a horizontal engagement guide wheel 152. As compared with embodiments shown in FIGS. 1, 2B, 3B, 4, and 5B, the horizontal engagement mechanism 140' may be modified as necessary or as desired, such as to eliminate the horizontal engagement guide wheel 152 (shown, e.g., in FIG. 6B).

The horizontal engagement latch 146, horizontal engagement stop 148 and the horizontal engagement tab 150 comprise aspects of the horizontal engagement mechanism 140' that align and engage the horizontal engagement mechanism 140' with the stand base 132. Optional horizontal engagement guide wheels 152 may be used to assist the pivot action of the horizontal engagement mechanism 140' relative to the stand base 132 via engagement of the self-engaging latch 108 located in axle bar slot 138 with the axle bar 106.

The horizontal engagement latch 146 is seen more easily in FIGS. 2B and 3B. Adjacent the horizontal engagement latch 146 may be a flat guide spring 144, with a counterpart on the opposing side of the horizontal engagement mechanism 140'. The flat guide springs 144 guide the mechanism 140' towards the stops 148. The engagement of the horizontal engagement stops 148 with the mechanism is depicted as a male-female engagement arrangement, respectively, i.e., stops fit inside openings or cavities 154 at the ends of the U-frame 142. However, the engagement arrangement may also be arranged in various other configurations, such as female-male (not shown), where possible extensions of mechanism fit inside possible cavities in the stops 148.

Alternatively, although not shown, stops 148 may include a back and forth adjustment mechanism 122' as well, akin to that of FIG. 2A, to adjust front to back the engagement position of the horizontal engagement mechanism 140'. Back and forth adjustment of the stops 148 may likewise necessitate comparable back and forth adjustment of the horizontal engagement latch 146 and the horizontal engagement tab 150, which may need similar back and forth adjustment mechanisms 122' of the own. Analogously, detachable assembly 140 instead may include a back and forth adjustment mechanism 122' between (also not shown) the posts 120 and the U-frame 142, which would obviate the need to adjust the position of the U-frame 142 relative to the stand base 132.

In an embodiment similar to those shown in FIGS. 1 to 4, the vertical adjustment mechanism 122 of FIG. 2A may be characterized as a front height adjustment mechanism, where "front" refers to the front axle 005. The pin 130 of FIG. 2A may be characterized as a front height adjustment pin. Likewise, a back and forth adjustment mechanism 122' may be characterized as a front horizontal position adjustment mechanism. Similarly, the vertical adjustment mechanism 122 of FIG. 2B may be characterized as a rear height adjustment mechanism, and the pin 130 of FIG. 2B may be characterized as a rear height adjustment pin, where "rear" refers to the rear axle 007. Analogously, the horizontal engagement mechanism 140' may be characterized as a rear horizontal engagement mechanism.

As introduced above, an individual may secure a motorcycle 001 using just the front wheel, just the rear wheel, or both the front and rear wheels, depending on the situation and the individual's intentions. If just one wheel 003, either the front or the rear wheel, is used, the individual may roll the motorcycle 001 into place to have the axle bar 106 engage the self-engaging latches 108 of the axle bar slots 138 of the motorcycle stand 102. A slight rocking motion of the motorcycle 001 may help to secure the axle bar 106 within the self-engaging latches 108. If both wheels 003 are used to secure the motorcycle 001, the individual preferably may use one exemplary slideable, adjustable motorcycle stand 102, and one exemplary pivotable, adjustable motorcycle stand 104, such as illustrated in FIG. 1. First the individual may secure a first axle bar 106, such as of the front wheel, into the exemplary slideable, adjustable motorcycle stand 102. Then, the individual may secure a second axle bar 106, such as of the rear wheel, into the exemplary pivotable, adjustable motorcycle stand 104. When two stands 102, 104 are used to secure the wheels 003, the individual may pivot the U-frame 142 to align and engage the rear horizontal engagement mechanism 140' with the stand base 132. The pivot action is useful, inasmuch as the motorcycle 001, having first been secured at the front wheel axle 005, cannot rock to engage the rear axle bar 106 with the rear self-engaging latches 108. However, if only the exemplary pivotable, adjustable motorcycle stand 104 is used to secure the motorcycle, the motorcycle may be secured by engaging the axle bar 106 with the self-engaging latches where the rear horizontal engagement mechanism 140' is engaged already with the stand base 132, as the pivot action is not needed in this scenario.

FIGS. 5A and 5B depict side elevation views of additional exemplary adjustable motorcycle stands 102' and 104', according to additional embodiments of the present invention. The stands 102' and 104' are depicted as including locking mechanisms 156. The locking mechanisms 156 foreseeably are intended to secure the bike 001 against casual attempts to steal the bike 001 or otherwise tamper with the engagement of the bike 001 with the stands 102', 104'. Locking mechanisms 156 may take any suitable form and may be placed in numerous locations on the stands 102', 104', according to an intended use of a particular location of the locking mechanism 156. For instance, locking mechanisms 156 may include one or more cover plates 158, one or more lockable loops 160, one or more aligned or alignable holes 162, and one or more locks 164. Any suitable lock 164 may be used. The locks 164 may be, for example, integrated, separate, and/or removable, and lockable by key and/or combination.

FIGS. 6A and 6B depict perspective views of further exemplary adjustable motorcycle stands 102" and 104", according to further embodiments of the present invention. Stands 102" and 104" are depicted as having fixed-height posts 120'. The post 120' in FIG. 6A also has a fixed position side to side and front to back, relative to the stand base 132. Stand 104" in FIG. 6B is depicted as having a post 120' also with a fixed position side to side and front to back, after engagement with and relative to the stand base 132. In addition, stand 104' includes stops 148 having tapered ends 166 fitting into openings 154 in the detachable assembly 140. The detachable assembly 140 depicted in FIG. 6B also does not include horizontal engagement guide wheels 152. The simpler configurations of stands 102" and 104" may present cost-effective manufacturing alternatives to the more complex, adjustable stand configurations depicted in FIGS. 1 to 5. Comparatively, stands 102" and 104" also may have longer useful lives, as they have fewer moving parts susceptible to wear and potential failure.

FIG. 7 depicts a perspective view of another exemplary adjustable motorcycle stand 102''' according to another embodiment of the present invention. Stand 102''' includes adjustment mechanism 122" that may adjust the width laterally, e.g., side to side, between the posts 120'. A telescoping axle bar 106' may be used to accommodate different widths. Lateral adjustment mechanism 122" may include, for instance, a position fixing mechanism 126" that may include, for example, a gearwheel 168 and cogged rails 170. The position fixing mechanism 126" may be attached to a laterally adjustable stand base 132' alone (as shown) or as an interface (not shown) between the posts 120' and a stand base 132, which may be wider than otherwise. A laterally adjustable stand base 132' optionally may include an adjustable chock 132a' split into two halves. By way of comparison, vertical adjustment mechanism 122 may adjust for wheels 003 of different radii, back and forth adjustment mechanism 122' may adjust for motorcycles 001 of different lengths, and lateral adjustment mechanism 122" may adjust for wheels 003 of different widths. For example, lateral adjustment mechanism 122" may be useful when securing wide, fat wheels 003 of an all-terrain vehicle (ATV).

Figure 8:
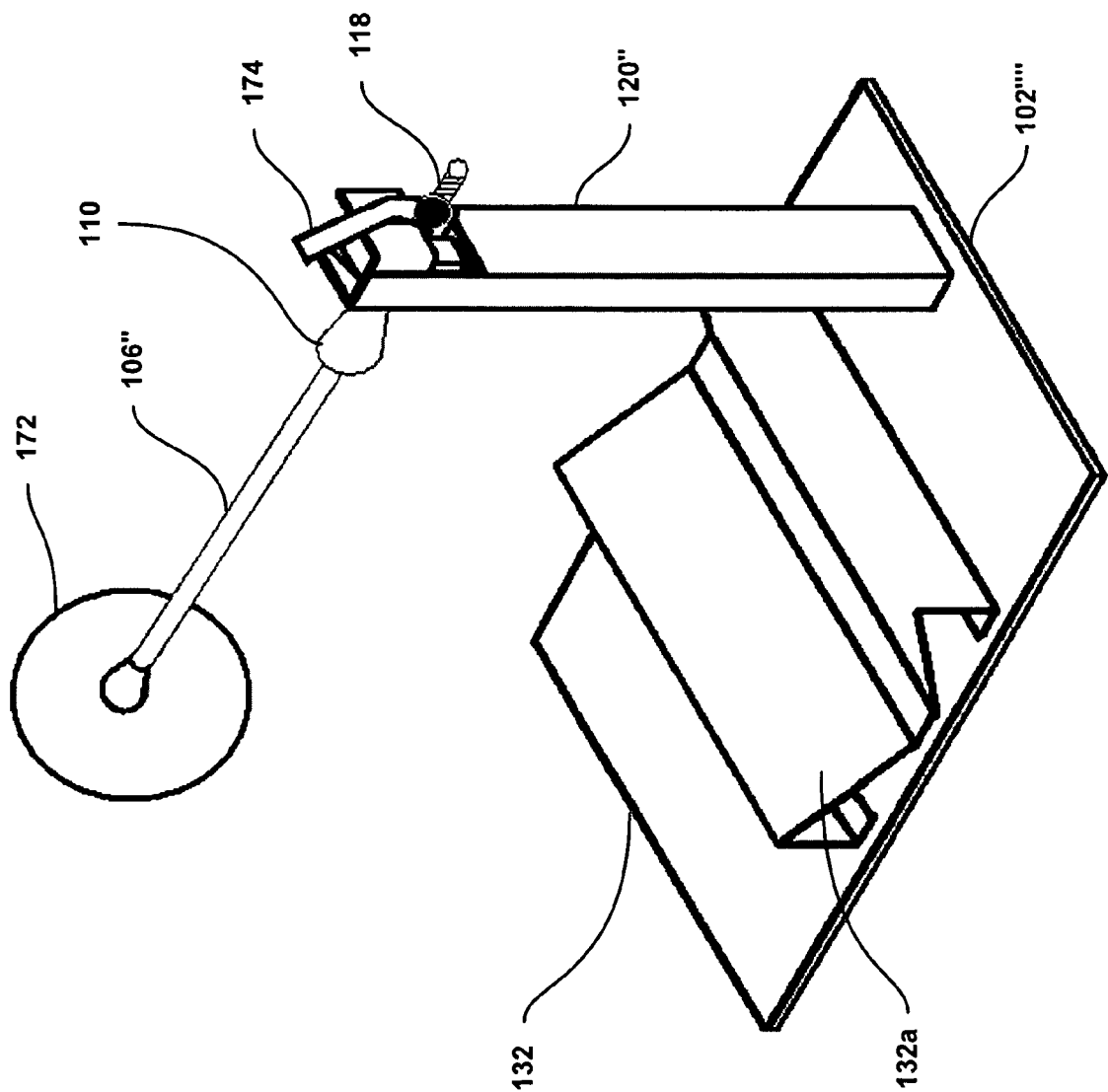
FIG. 8 depicts a perspective view of yet another exemplary adjustable motorcycle stand according to yet another embodiment of the present invention.

FIG. 8 depicts a perspective view of yet another exemplary adjustable motorcycle stand 102"" according to yet another embodiment of the present invention. Stand 102"" includes only a single axle support post 120" and a modified axle bar 106". Inasmuch as post 120" preferably is positioned to be at the same height as axle 005, 007 of a rider-less motorcycle 001, stand 102"" may be equipped with only a single post 120" to inhibit side to side leaning of the motorcycle 001. In conjunction with the single post 120", a modified axle bar 106" may be used that includes a counter brace 172. Counter brace 172 may be large to provide an increased area of support. Modified axle bar 106" also may include a tightening mechanism 174, such as a threaded quick-release mechanism, similar to those commonly used in bicycle wheels, to securely tighten the counter brace 172 against the axle 005, 007 and/or the wheel 003.

As with stand configurations discussed above, the axle bar 106" may be positioned within the axle bore 009 to engage an open self-engaging latch 108', with the counter brace 172 opposite the latch 108'. A bushing 110 may be positioned on the bar 106", after insertion of the bar 106" through the bore 009, to stabilize the bar 106" within the bore 009 as it approaches the stand 102"". However, the tightening mechanism 174 has not yet been tightened. After engagement of bar 106" with the stand 102"", the tightening mechanism 174 may be tightened to improve and secure the stabilization of the motorcycle 001.

Two stands 102"" may be used, for example, to secure the same, or opposite sides of a motorcycle 001. When used on the same side, the stands 102"" may the same configuration and face the same way. When used on opposite sides, the stands 102"" may have mirror-image configurations facing each other. For instance, one stand 102"" may be on one side of the front axle 005, and the second stand 102"" may be on the other side of the rear axle 007. If properly spaced to simultaneously engage the respective axle bars 106", two stands 102"" may be used in a one-stage method, where the motorcycle 001 is rolled into place and both wheels 003 engage the stands 102"" in one motion. Such a one-stage engagement method obviates the need to have a stand 104 with a pivotable, detachable assembly 140 that engages the second wheel 003 from a direction opposite the direction with which the first wheel 003 engaged a stand 102"".

While the invention herein disclosed has been described by means of specific embodiments and applications thereof, numerous modifications and variations could be made thereto by those skilled in the art without departing from the scope of the invention set forth in the claims. In the description above numerous specific details are set forth in order to provide a more thorough understanding of embodiments of the invention. It will be apparent, however, to an artisan of ordinary skill that the present invention may be practiced without incorporating all aspects of the specific details described herein. In other instances, specific details well known to those of ordinary skill in the art have not been described in detail so as not to obscure the invention. Readers should note that although examples of the invention are set forth herein, the claims, and the full scope of any equivalents, are what define the metes and bounds of the invention.

REFERENCE NUMERALS

001 A Motorcycle
003 A Motorcycle Wheel
005 A Front Axle
007 A Rear Axle
009 An Axle Bore
011 A Wheel Shock
100 A Motorcycle Stand System
102 A Slideable, Adjustable Motorcycle Stand
102' A Motorcycle Stand
102" A Motorcycle Stand
102''' A Motorcycle Stand
102"" A Motorcycle Stand
104 A Pivotable, Adjustable Motorcycle Stand
104' A Motorcycle Stand
104" A Motorcycle Stand
106 An Axle Bar
106' A Telescoping Axle Bar
106" A Modified Axle Bar
108 A Self-Engaging Latch
108' An Open Self-Engaging Latch
108a A Latch Lever/Release Mechanism
110 A Bushing
110' A Fixed Bushing
112 A Distal End Of An Axle Bar
114 A Flange
116 A Flare Or Notch On An Axle Bar
118 A Screw Thread
120 An Adjustable Vertical Axle Support Post
120' A Fixed-Height Vertical Axle Support Post
120" A Single Vertical Axle Support Post
122 A Vertical Adjustment Mechanism
122' A Back And Forth Adjustment Mechanism
122" A Lateral Adjustment Mechanism
124 A Vertical Telescoping Housing
124' A Horizontal Slideable Housing
126 A Vertical Position Fixing Mechanism
126' A Horizontal Position Fixing Mechanism
126" A Lateral Position Fixing Mechanism
128 A Hole
130 A Pin
132 A Stand Base
132a A Chock
132' A Laterally Adjustable Stand Base
132a' An Adjustable Chock Split Into Two Halves
134 An Attachment Means Or Device
136 A Screw
138 An Axle Bar Slot
140 A Detachable Assembly
140' A Pivotable Horizontal Engagement Mechanism
142 A U-Frame
144 A Horizontal Engagement Guide/Flat Guide Spring
146 A Horizontal Engagement Latch
148 A Horizontal Engagement Stop
150 A Horizontal Engagement Tab
152 A Horizontal Engagement Guide Wheel
154 An Opening Or Cavity At An End Of The U-Frame
156 A Locking Mechanism
158 A Lockable Cover Plate
160 A Lockable Loop
162 An Aligned Or Alignable Lockable Hole
164 A Lock
166 A Tapered End Of A Horizontal Engagement Stop
168 A Gearwheel
170 A Cogged Rail
172 A Counter Brace
174 A Tightening Mechanism/Quick-Release Mechanism

What is claimed is:
1. A motorcycle stand comprising:
a stand base;

an axle support post, detachably connected to the stand base at a bottom end of the axle support post;

a self-engaging latch, positioned in an axle bar slot near a top end of the axle support post and adapted to engage an axle bar of a wheel;

a wheel chock, positioned on top of the stand base and next to the axle support post;

a pivotable detachable assembly, connected to the axle support post and detachably connecting the axle support post to the stand base, having a horizontal engagement mechanism adapted to detachably connect the pivotable detachable assembly to the stand base; and wherein the motorcycle stand is adapted to secure the wheel of a motorcycle having up to four wheels.

2. The motorcycle stand of claim 1 wherein the self-engaging latch is spring-loaded and includes a release mechanism.

3. The motorcycle stand of claim 1 further comprising:
a height adjustment mechanism, connected to the axle support post.

4. The motorcycle stand of claim 1 further comprising:
a horizontal adjustment mechanism, connected to the axle support post.

5. A motorcycle stand comprising:
a stand base;
an axle support post, detachably connected to the stand base at a bottom end of the axle support post;

a self-engaging latch, positioned in an axle bar slot near a top end of the axle support post and adapted to engage an axle bar of a wheel;

a pivotable detachable assembly, connected to the axle support post and detachably connecting the axle support post to the stand base, having a horizontal engagement mechanism adapted to detachably connect the pivotable detachable assembly to the stand base; and a second axle support post, connected to the stand base and including a second self-engaging latch adapted to engage the axle bar;

wherein the motorcycle stand is adapted to secure the wheel of a motorcycle having up to four wheels.

6. The motorcycle stand of claim 5 wherein the self-engaging latch is spring-loaded and includes a release mechanism.

7. The motorcycle stand of claim 5 further comprising:
a height adjustment mechanism, connected to the axle support post.

8. The motorcycle stand of claim 5 further comprising:
a horizontal adjustment mechanism, connected to the axle support post.

* * * * *